(12) United States Patent
Grzan et al.

(10) Patent No.: US 7,119,704 B2
(45) Date of Patent: Oct. 10, 2006

(54) MACHINE GUARDING SYSTEM HAVING A SENSING MAT WITH STATUS INDICATOR LIGHTS

(75) Inventors: John Grzan, Brentwood, NY (US); Robert Keats, London (CA)

(73) Assignee: Tapeswitch Corporation, Farmingdale, NY (US)

( * ) Notice: Subject to any disclaimer, the term of this patent is extended or adjusted under 35 U.S.C. 154(b) by 0 days.

(21) Appl. No.: 10/968,508

(22) Filed: Oct. 19, 2004

(65) Prior Publication Data
US 2006/0082465 A1 Apr. 20, 2006

(51) Int. Cl.
G08B 21/00 (2006.01)

(52) U.S. Cl. .................. 340/665; 340/666; 340/668; 200/86 R; 200/86.5

(58) Field of Classification Search ............... 340/635, 340/665, 666, 668; 200/86.5, 86 R
See application file for complete search history.

(56) References Cited

U.S. PATENT DOCUMENTS

| | | | |
|---|---|---|---|
| 4,245,219 A | 1/1981 | Dempsey et al. | |
| 4,737,764 A | 4/1988 | Harrison | |
| 4,758,815 A | 7/1988 | Lovell | |
| 5,001,310 A | 3/1991 | O'Meara, Jr. et al. | |
| 5,210,528 A | 5/1993 | Schulman et al. | |
| 5,602,428 A | 2/1997 | Schultz et al. | |
| 5,815,068 A | 9/1998 | Vadseth | |
| 6,054,658 A | 4/2000 | Duhon et al. | |
| 6,481,877 B1 | 11/2002 | Bello, Jr. | |
| 6,646,545 B1 | 11/2003 | Bligh | |
| 6,876,306 B1 * | 4/2005 | Nelson et al. | 340/666 |
| 2002/0066400 A1 | 6/2002 | Pharo et al. | |

* cited by examiner

*Primary Examiner*—Julie Bichngoc Lieu
(74) *Attorney, Agent, or Firm*—Hoffmann & Baron, LLP (57) ABSTRACT

A machine guarding system generally includes a switch mat in electrical communication with a machine being guarded. The switch mat is adapted to be placed on a floor adjacent the machine being guarded and includes a pressure actuated switch mechanism which causes power to the machine to be terminated when a pressure is applied to the switch mat. The switch mat further includes a status indicator display disposed on a surface of the switch mat which is illuminated based on a status of the machine being guarded. In a preferred embodiment, the machine guarding system further includes a machine control unit for controlling power to the machine being guarded. The switch mat is in electrical communication with the machine control unit, wherein the switch mechanism causes the machine control unit to terminate power to the machine when a pressure is applied to the switch mat. The machine control unit also illuminates the indicator display based on a status of the machine being guarded.

19 Claims, 5 Drawing Sheets

MACHINE GUARDING SYSTEM HAVING A SENSING MAT WITH STATUS INDICATOR LIGHTS

BACKGROUND OF THE INVENTION

The present invention relates generally to safety systems to protect persons from injury from industrial machines, and more particularly, to a system for terminating power and indicating an active condition of a machine.

It is known in the art to provide safety systems for dangerous machinery and industrial apparatus to protect persons from injury from such equipment. Such dangerous equipment includes welding machines, robotic assembly devices, metal cutting equipment and the like, all of which may be self-operating or person-operated. Generally, safety systems for such machinery typically involve some form of means for preventing personnel from inadvertently approaching the dangerous equipment or involve some form of alarm or power cut-off to the machine which is activated upon a dangerous condition, such as when a person gets too close to the dangerous equipment. Examples of such safety systems include dual hand operated controls which forces an operator to keep both hands on the controls, presence sensing devices incorporating light beams and receivers and electric switch mats connected to a machine controller for terminating power to the machine if someone steps on or off the mat.

Various types of electrical switch mats are known in the art. Electrical switch mats have been designed for use in many different applications including use in floor mats for security, safety or other purposes to detect movement of objects or pedestrian traffic thereover. Generally, electrical switch mats include one or more pressure-actuated switches incorporated within a floor mat material which protects the switch against wear. For example, normally open and normally closed pressure-sensitive electrical ribbon switches have been incorporated into numerous designs for electrical switch mats. Open and closed pressure-sensitive ribbon switches generally include a pair of either spaced or closed conductors respectively supported in an insulative jacket. Generally, relatively light pressure on the jacket will close the space in an open switch and open the conductors in a close switch thereby activating the switch. Thus, someone stepping on or off an electrical switch mat having a ribbon switch incorporated therein will activate the switch.

Electrical switch mats as described above have been extremely useful in detecting and responding to the presence, or absence, of the operator or others anywhere on its sensing surface, wherein the sensing surface is defined as the area covered by a single mat or a plurality of mats in combination. In one typical application, one or more sensing mats are placed directly in front of a piece of machinery, wherein the machine operator stands on the mat during operation of the machinery. If the operator steps off the mat, or if someone else steps on the mat, the switch mat is activated to terminate power to the machine.

In another application, the dangerous equipment may be surrounded by a plurality of switch mats to define a danger zone, wherein a person entering the danger zone will step on a mat, thereby activating a switch to terminate power to the equipment. Alternatively, the dangerous equipment may be substantially surrounded by a protective barrier, such as a guard cage or fence, to define a danger zone and a switch mat is placed at the only entrance into the danger zone. Similarly, anyone entering the danger zone will step on the switch mat to terminate power to the dangerous equipment.

While such switch mat based safety systems are effective in terminating power to a piece of dangerous equipment upon a change in status within the danger zone, it is often difficult for persons approaching such a danger zone to ascertain the present status within the danger zone. In particular, a person having a need to enter the danger zone may not be able to easily determine if it is indeed safe to enter (e.g., the dangerous machinery is already turned off), or whether the zone is in a danger status (e.g. the machinery is operating).

Accordingly, it would be desirable to provide a machine guarding safety system that can readily indicate a present status of a danger zone surrounding the dangerous machinery. It would be further desirable to provide a machine guarding safety system utilizing a switch mat having a visual status indicator incorporated directly in the switch mat to display an active status of the danger zone to those approaching the switch mat.

SUMMARY OF THE INVENTION

The present invention is a machine guarding system that generally includes a switch mat in electrical communication with a machine being guarded. The switch mat is adapted to be placed on a floor adjacent the machine being guarded and includes a pressure actuated switch mechanism which causes power to the machine to be terminated when a pressure is applied to the switch mat. The switch mat further includes a status indicator display disposed on a surface of the switch mat which is illuminated based on a status of the machine being guarded.

In a preferred embodiment, the machine guarding system further includes a machine control unit for controlling power to the machine being guarded. The switch mat is in electrical communication with the machine control unit, wherein the switch mechanism causes the machine control unit to terminate power to the machine when a pressure is applied to the switch mat. The machine control unit also illuminates the indicator display based on a status of the machine being guarded.

Preferably, the status indicator display is made up of a plurality of first and second color light emitting diodes (LEDs). The first color is illuminated by the machine control unit to indicate a safe condition of the machine being guarded and the second color is illuminated by the machine control unit to indicate a dangerous condition of the machine being guarded. Also, the switch mechanism causes the machine control unit to illuminate the first color when pressure is applied to the switch mat and when power is terminated to the machine being guarded to indicate the safe condition.

The machine control unit preferably includes a flasher, a timer and a switch for activating the timer. The flasher alternately illuminates the first and second colors to indicate an interim condition of the machine being guarded. The timer initiates a timing sequence when activated by the switch, wherein the flasher alternately illuminates the first and second color light emitting diodes. The timer then ends the timing sequence after a pre-determined amount of time, wherein the machine control unit provides power to the machine being guarded and illuminates the second color to indicate the dangerous condition of the machine being guarded.

In one embodiment, the machine guarding system further includes a guard cage substantially surrounding the machine being guarded. The guard cage defines a machine work area and an entrance to the machine work area. The switch mat is placed at the entrance to the machine work area to detect intrusion into the work area. Alternatively, a plurality of switch mats surrounding the machine being guarded is provided, wherein the switch mats are electrically connected to each other to define the machine work area.

The switch mat of the present invention preferably includes a support frame, a flexible plate member supported in the support frame, a pressure actuated switch mechanism disposed between the support frame and the plate member and a status indicator display disposed on a surface of one of the support frame or the plate member. Pressure applied to the plate member actuates the switch mechanism illuminates the status indicator display. The support frame of the switch mat further preferably includes a ramp portion and the status indicator display is disposed on a top surface of the ramp portion.

The present invention further involves a method for guarding a machine work area against intrusion. The method generally includes the step of providing a switch mat on a floor adjacent the machine work area being guarded. The switch mat includes a pressure actuated switch mechanism and a status indicator display. The method according to the present invention further includes the steps of terminating power to a machine in the machine work area when a pressure is applied to the switch mechanism of the switch mat and illuminating the indicator display of the switch mat based on a status of the machine work area.

In a preferred embodiment, the step of illuminating the indicator display of the switch mat is achieved by illuminating a plurality of first and second color light emitting diodes (LEDs). The first color light emitting diode is illuminated to indicate a safe condition of the machine work area and the second color is illuminated to indicate a dangerous condition of the machine work area. The first color light emitting diode is also illuminated when a pressure is applied to the switch mechanism and power is terminated to the machine in the work area to indicate the safe condition.

Also, the first and second color light emitting diodes are further preferably illuminating in an alternating fashion to indicate an interim condition of the machine work area. In this regard, the method of the present invention further preferably includes the steps of initiating a timing sequence to begin the step of alternately illuminating the first and second color light emitting diodes, ending the timing sequence after a pre-determined amount of time, illuminating the second color light emitting diode to indicate the dangerous condition of the machine work area after the timing sequence has ended and providing power to the machine in the machine work area after the timing sequence has ended.

As a result of the present invention, a safety system is provided to visually indicate an interactive status between persons and machines, equipment and other dangerous devices. Status indicator lights incorporated in a sensing mat of the safety system serve to indicate, enhance or draw attention to the current status of a potential danger zone surrounding a machine or other industrial equipment.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
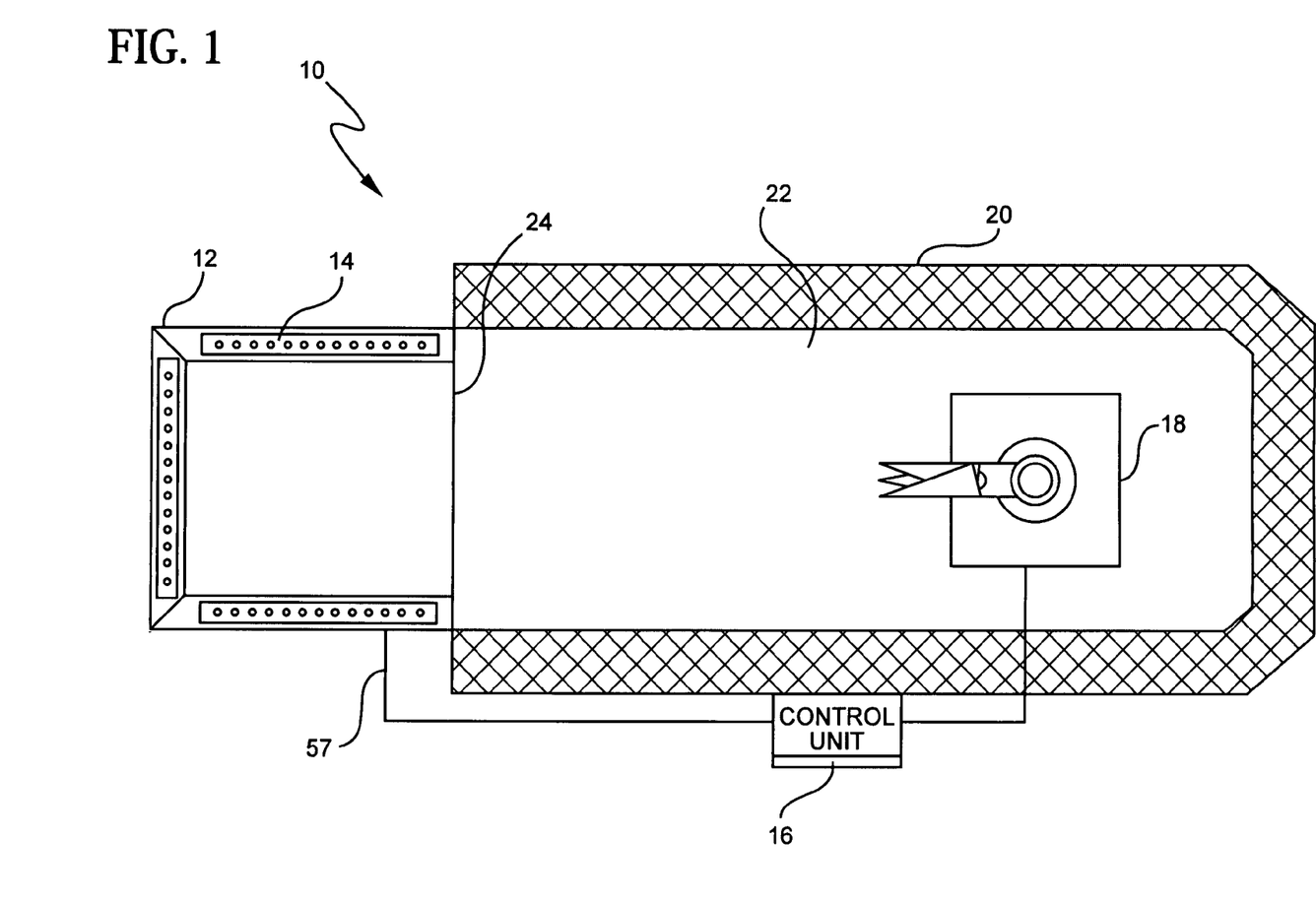
FIG. 1 is a schematic drawing of the machine guarding system formed in accordance with the present invention.

Referring first to FIG. 1, a machine guarding system 10 formed in accordance with the present invention generally includes an electrical switch mat 12 having status indicator lights 14 incorporated therein and a control unit 16 electrically connected to the switch mat. A switch mat or sensing mat as used herein is also defined as encompassing sensing edges, sensing bumpers and ribbon switches.

The control unit 16 is electrically connected to a machine 18 or other piece of dangerous equipment for controlling power to the machine based on activation of the switch mat 12. The guarding system arrangement shown in FIG. 1 includes a hard guarding cage 20 substantially surrounding the machine 18 to define a danger zone 22 having an entrance 24. In this arrangement, the switch mat 12 is located at the entrance 24 to the danger zone 22 so that anyone entering the danger zone will necessarily step on the switch mat.

Figure 2:
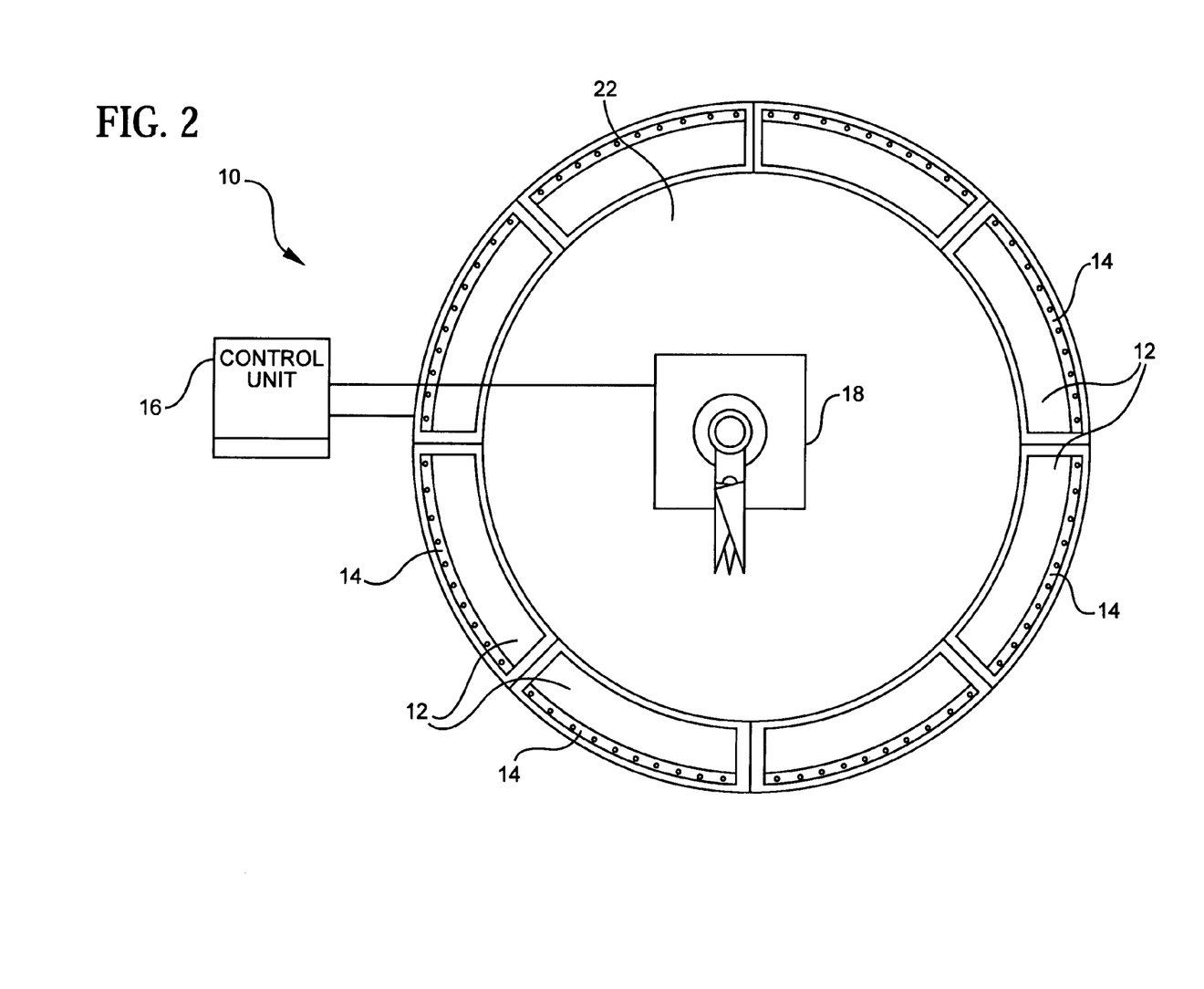
FIG. 2 is a schematic drawing of an alternative embodiment of the machine guarding system formed in accordance with the present invention.

As described above, however, a plurality of switch mats 12 may be utilized instead of the hard cage 20 to define the danger zone 22, as shown in FIG. 2. In this embodiment, each switch mat 12 is electrically connected in series to adjacent switch mats to form a continuous sensing barrier. Thus, someone stepping on any one switch mat 12 of the sensing barrier will trigger the system as described in further detail below.

Figure 3:
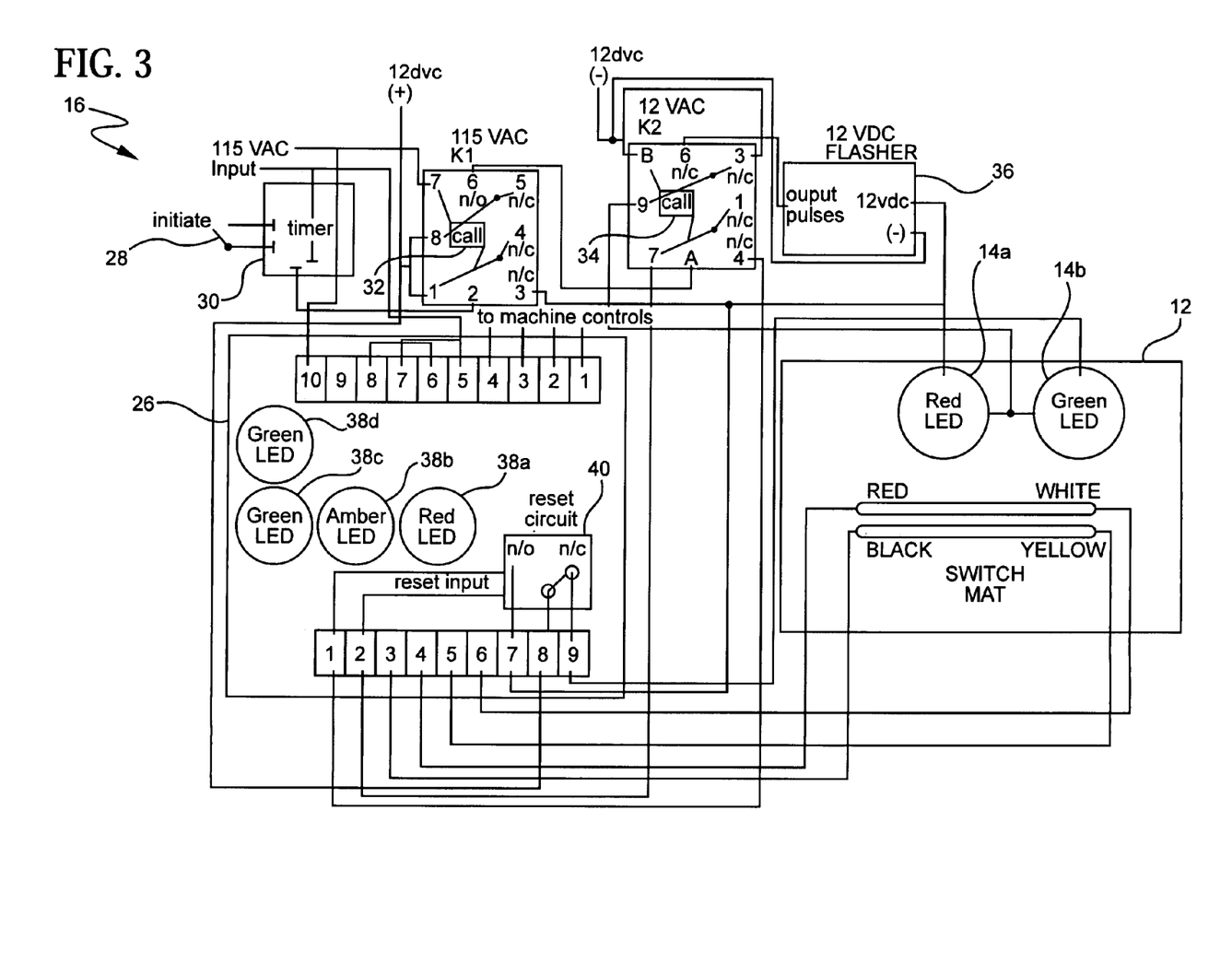
FIG. 3 is a schematic wiring diagram of the machine guarding system shown in FIG. 1.

Referring additionally to FIG. 3, the switch mat 12 preferably includes light emitting diode (LED) indicator lights 14 of at least two contrasting colors disposed around a substantial portion of the periphery of the mat. Preferably, the switch mat 12 includes red LEDs 14a interspersed with green LEDs 14b along the peripheral edge of the mat. As will be discussed in further detail below, the control unit 16 alternately illuminates the red LEDs 14a and the green LEDs 14b depending on the active status of the danger zone 22.

The control unit 16 preferably includes a machine controller 26, a normally open momentary switch 28, a 115VAC timer 30 with 0.5 to 10 second adjustability, a 115 VAC DPDT relay K1 having a coil 32, a 12VDC DPDT relay K2 having a coil 34, and a 12 VDC flasher 36. The control voltages used are an externally supplied 115VAC and 12 VDC, which can be externally or internally supplied to the control unit 16. The machine controller 26 also preferably includes its own status indicator lights in the form of a red "MACHINE POWER" LED 38a, an amber "RESET" LED 38b, a green "SENSOR CLEAR" LED 38c and a green "OUTPUT", the operation of which will be described in further detail below. One suitable machine controller 26 for use with the present invention is Guardstar Model No. PSSU/3 manufactured and distributed by Tapeswitch Corporation, 100 Schmitt Boulevard, Farmingdale, N.Y. Other control unit types, however, may also be used.

When the danger zone 22 is in a safe or static condition (i.e., the machine 18 is turned off and not operating), the red "MACHINE POWER" status indicator LED 38a of the controller 26 is off, the yellow "RESET" status indicator LED 38b is off, the green "SENSOR CLEAR" status indicator LED 38c is on and the "OUTPUT" status indicator LED 38d is off. In this condition, the control unit 16 also illuminates the green LEDs 14b on the switch mat 12 to indicate a safe condition within the danger zone 22, wherein entry can be made without danger.

When it is desired to power-up the machine 18, the normally open momentary initiation switch 28 is pressed and released to start the timer 30. The timer 30 energizes the 115 VAC coil 32 of the relay K1, making the relay contacts of pins 2 and 7 change state from normally closed to normally open. +12 VDC is then applied from the relay K1, pin 6 to energize the coil 34 of the 12 VDC relay K2 making the relay contacts of pins A and B change state from normally closed to normally open. +12 VDC is also applied thru the contacts of pin 3 of the relay K1, to the 12 VDC flasher 36, which in turn alternately illuminates or "flashes" the red and green LEDs 14a and 14b of the switch mat 12. Preferably, +12 VDC is applied to the green LED 14b of the switch mat 12 through an N/C (pin 9) portion of a reset circuit 40 in the machine controller 26. Also, in a preferred embodiment, pin 6 of the relay K2 is supplied pulses from the flasher 36, which causes both the red and green LEDs 14a and 14b of the switch mat 12 to alternately flash on and off at about 1 second intervals. Moreover, pins 4 and 7 of the relay K2 preferably act like a momentary switch to the reset input of the reset circuit 40 of the machine controller 26.

The LEDs 14a and 14b of the switch mat 12 thus illuminated in a flashing green and red pattern indicate that the machine area 22 is now in a condition that a change is about to occur. Specifically, the flashing red and green LEDs 14a and 14b of the switch mat 12 indicate an imminent change from a safe condition to a potentially dangerous condition. In this regard, the LEDs on the controller 26 may also be illuminated in a particular pattern to indicate this condition. In particular, the red "MACHINE POWER" status indicator LED 38a of the controller 26 will still be off, but the yellow "RESET" status indicator LED 38b will now be turned on, while the green "SENSOR CLEAR" status indicator LED 38c is on and the "OUTPUT" status indicator LED 38d is off.

Once the timer 30 has timed out, voltage is removed from pin 2 of the relay K1 and the relay contacts return to their normally closed position. This action causes the applied voltage from pin 6 of the relay K1 to pin A of the relay K2 to stop, thereby de-energizing relay K2. The pulses from the 12 VDC flasher 36 are no longer present because pin 6 of the relay K2 has returned to it normally open position causing the pulses going to both the red and green LEDs 14a and 14b of the switch mat 12 to stop. Pin 1 of the relay K2, now normally closed, allows pin 4 of the relay K2 to be normally open. This action causes the reset input of the controller reset circuit 40 to make the reset circuit change from normally closed to normally open, switching +12VDC thru pin 7 of the controller 26 to energize the red LED 14a of the switch mat 12 and de-energize the green LED 14b of the switch mat. With the red LED 14b of the switch mat 12 now steadily illuminated, the switch mat indicates that the machine area 22 is now in a dangerous condition making it unsafe to enter.

Similarly, in an unsafe status condition, the controller LEDs are illuminated accordingly. Specifically, the red "MACHINE POWER" status indicator LED 38a of the controller 26 will now be on, while the yellow "RESET" status indicator LED 38b will now be turned off. The green "SENSOR CLEAR" status indicator LED 38c is on and the "OUTPUT" status indicator LED 38d is off.

If there is any entry into the machine area danger zone 22, the switch mat 12 will detect such entry and cause power to the machine 18 to be terminated. In particular, when the switch mat 12 is activated, the internal switch mechanism of the mat changes from a normally open to a closed condition, as will be described in further detail below. This causes the controller 26 to open an output circuit to the machine controls, thereby shutting the machine off. The reset circuit 40 in the controller 26 changes from normally open to normally closed, whereby the +12VDC is removed from between pin 7 of the controller and the red LED 14a of the switch mat 12, thereby turning the red LED off. On the other hand, +12VDC is now applied thru pin 9 of the controller 26, thereby turning on the green LED 14b of the switch mat 12. Thus, the green LEDs 14b of the switch mat 12 are again steadily illuminated to indicate that the machine area 22 is now safe to enter. In the same manner, the red "MACHINE POWER" status indicator LED 38a of the controller 26 will now be off and the yellow "RESET" status indicator LED 38b will be off, but the green "SENSOR CLEAR" status indicator LED 38c will now be turned off and the "OUTPUT" status indicator LED 38d will be off.

Once the sensing mat 12 is cleared, the machine control system 10 returns to its static condition, as described above. Specifically, the green LEDs 14b of the switch mat 12 are steadily illuminated until the initiation sequence is begun by pressing and releasing the normally open momentary initiation switch 28 to start the timer 30. Once the timer 30 times out, power is restored to the machine 18.

Figure 4:
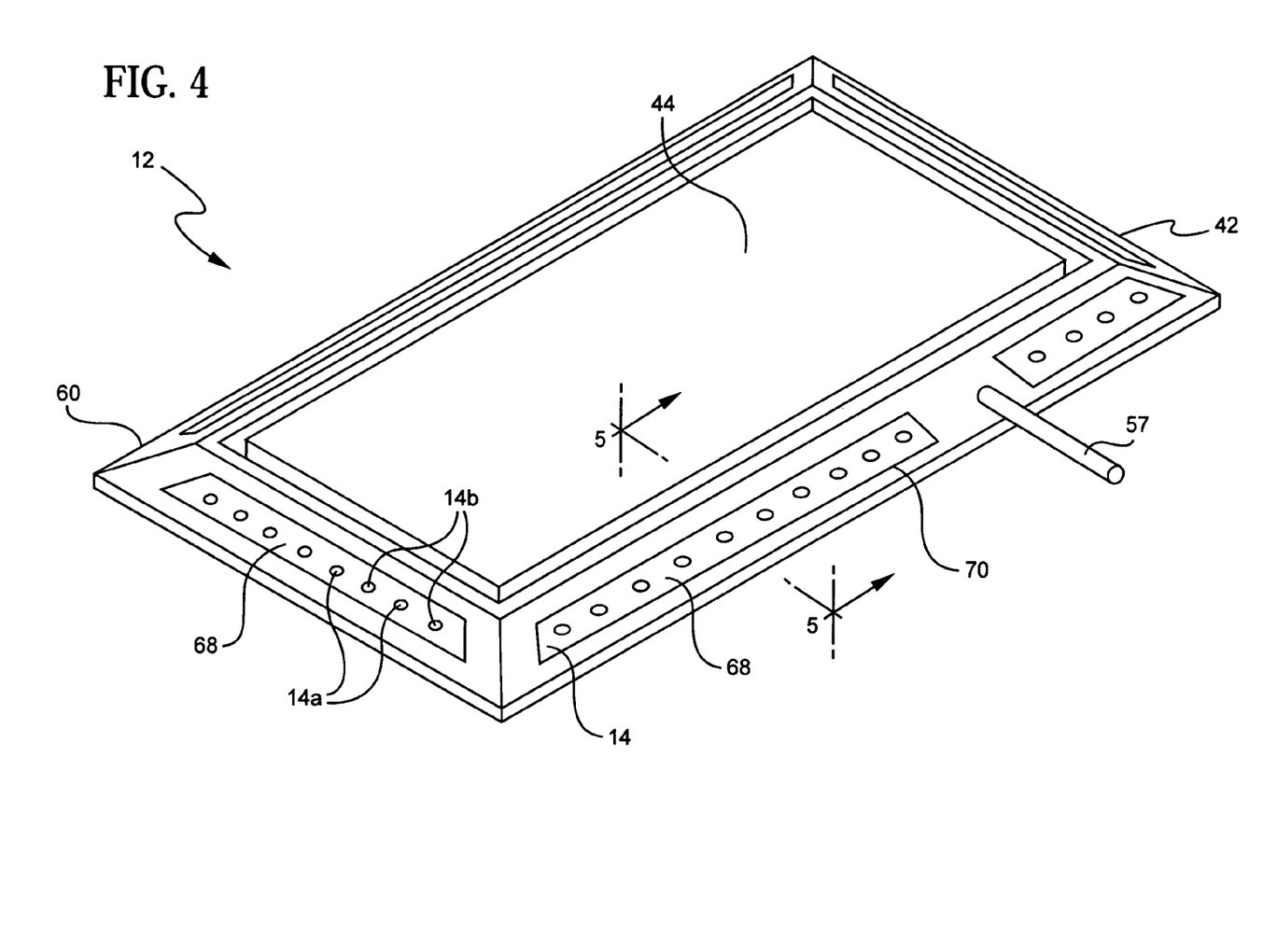
FIG. 4 is a top perspective view of a sensing mat with status indicator lights formed in accordance with the present invention.
Figure 5:
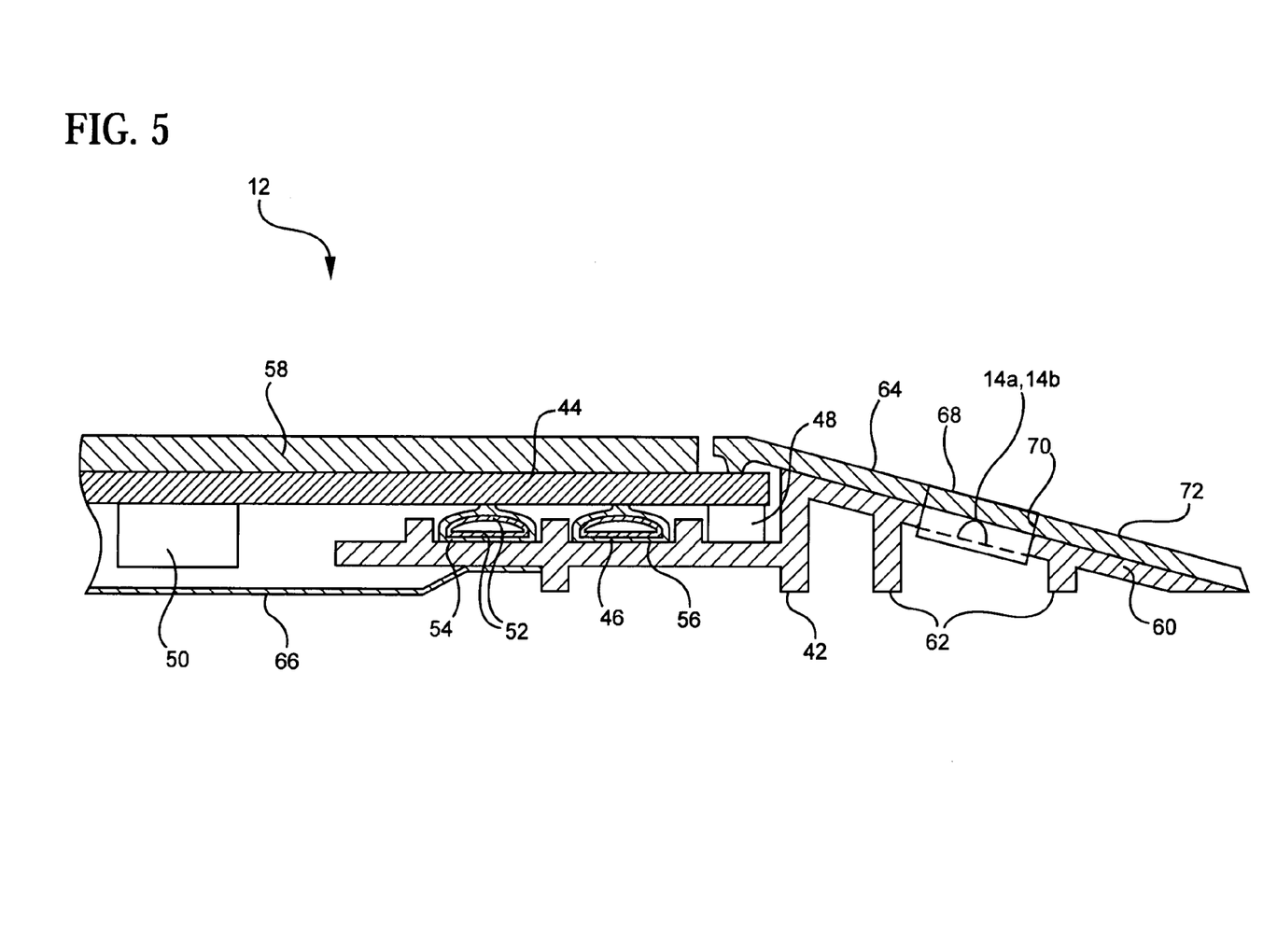
FIG. 5 is a cross-sectional view of the sensing mat shown in FIG. 4 taken along the line 5—5.

As mentioned above, various types of switch mats may be used with the present invention. However, in a preferred embodiment, the present invention utilizes a switch mat as described in commonly owned U.S. Pat. No. 6,054,658, the specification of which is incorporated herein by reference. In particular and as shown in FIGS. 4 and 5, the electrical switch mat 12 of the preferred embodiment generally includes a semi-rigid support frame 42 a flexible plate member 44 and at least one switch mechanism 46 disposed between the support frame and the plate member. Preferably, the switch mat 12 further includes a plurality of elastic members 48 and a plurality of plate member supports 50 for helping support the plate member 44 within the frame support 42.

The switch mechanism 46 is operable under pressure between a closed condition and an open condition and is maintained, in this case, in the opened condition in the absence of pressure. The switch mechanism 46 can be a conventional open-style ribbon switch, as described above, which generally includes a pair of vertically spaced electrical conductors 52 enclosed in an insulative jacket 54. Compression applied to the plate member 44 transfers pressure to the insulative jacket 54 causing the pair of electrical conductors 52 to move into electrical engagement. Alternatively, the switch mechanism 46 can be a closed-type ribbon switch wherein pressure applied to the switch interrupts the electrical engagement of the contacts.

Each switch mechanism 46 is supported within a respective protective receiving space 56 of the support frame 42 which extends across the surface area of the plate member 44. The switch mechanisms 46 can be electrically connected to each other in a conventional manner with wire leads to maintain electrical conductivity between electrical conductors of the intermittent-sections of the switch mechanisms.

An external wire lead 57 electrically connects the plurality of switching mechanisms 46 to the control unit 16.

The support frame 42 is preferably made from a plurality of aluminum frame members that can be sized to fit the particular needs of the electric mat user. For example, FIGS. 1 and 4 show rectangular electrical switch mats 12, but other shapes and configurations are contemplated, such as semi-circular shaped switch mats, as shown in FIG. 2. The plate member 44, which may also be made from aluminum, is sized to fit within the two-dimensional area defined by the support frame 42 and may also be covered with a flooring material 58. The plate member 44 is supported by a plurality of plate-member supports 50 attached to the bottom of the plate member, as shown in FIG. 5. The plate-member supports 50 are sized to insure that in the presence of pressure, the plate member 44 can freely deflect to transmit activating compression to the switch mechanisms 46. However, once the switch mechanism has been activated, the plate-member supports 50 prevent further deflection of the plate member. The plate member 44 is further preferably supported by a plurality of open cell foam elastic members 48 for biasing the plate member with respect to the support frame 42.

As shown in FIG. 5, the support frame 42 includes a ramp portion 60 to facilitate pedestrian traffic and objects which are rolled across the electric switch mat 12. The ramp portion 60 includes a plurality of ramp support members 62 extending from a bottom surface thereof for reinforcement of the ramp portion and a skid resistant dust cover 64 disposed over a top surface thereof. Furthermore, in order to seal the bottom of the electrical switch mat 12, a dust barrier 66 is preferably provided. The dust barrier 66 can be formed from a plastic fabric and is attached at the base of the support frame 42.

However, unlike conventional switch mats, the switch mat 12 of the present invention includes status indicator lights 14 incorporated on a surface thereof. In a preferred embodiment, the status indicator lights 14 of the present invention are in the form of one or more light strips 68 having alternating red and green LEDs 14a and 14b disposed thereon. The strips 68 are received in correspondingly sized slots 70 or recesses formed in a top surface 72 of the ramp portion 60 of the support frame 42. The LED strips 68 may be adhered or otherwise fastened within the receiving slots 70 of the support frame so that the strips are disposed flush with the top surface 72 of the ramp portion. The strips 68 preferably extend around the entire periphery of the switch mat 12 so that the indicator LEDs can be seen from any direction.

While the present invention has been described herein with respect to a sensing mat or a sensing edge, it is conceivable that the status indicator lights can also be incorporated in treadles, interlocks and light curtains. For example, another possible application of the present invention is in a transit bus treadle, wherein the LED status indicator lights will indicate to passengers a "safe" mode when green so that passengers may enter or exit the bus, a "warning" mode when flashing green and red to indicate that the bus doors will close shortly and a "danger" mode when red to indicate that the doors are closed or when somebody is already on the treadle. Other possible applications of the present invention include assembly line applications, commercial car wash facilities, powered door applications, amusement parks and point of purchase advertising.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A machine guarding system comprising a switch mat in electrical communication with a machine being guarded, said switch mat being adapted to be placed on a floor adjacent the machine being guarded and including:
   a pressure actuated switch mechanism, said switch mechanism causing power to the machine being guarded to be terminated when a pressure is applied to said switch mat; and
   a status indicator display disposed on a surface of said switch mat, said indicator display being illuminated based on a status of the machine being guarded.

2. A machine guarding system as defined in claim 1, further comprising a machine control unit for controlling power to a machine being guarded, said switch mat being in electrical communication with said machine control unit, wherein said switch mechanism causes said machine control unit to terminate power to the machine when a pressure is applied to said switch mat and said machine control unit illuminating said indicator display based on a status of the machine being guarded.

3. A machine guarding system as defined in claim 2, wherein said status indicator display comprises a plurality of light emitting diodes (LEDs).

4. A machine guarding system as defined in claim 3, wherein said light emitting diodes (LEDs) comprise a first color illuminated by said machine control unit to indicate a safe condition of the machine being guarded and a second color illuminated by said machine control unit to indicate a dangerous condition of the machine being guarded.

5. A machine guarding system as defined in claim 4, wherein said switch mechanism causes said machine control unit to illuminate said first color light emitting diode (LED) when said pressure is applied to said switch mat and when power is terminated to the machine being guarded to indicate said safe condition.

6. A machine guarding system as defined in claim 4, wherein said machine control unit includes a flasher for alternately illuminating said first color light emitting diode (LED) and said second color light emitting diode (LED) to indicate an interim condition of the machine being guarded.

7. A machine guarding system as defined in claim 6, wherein said machine control unit includes a timer and a switch for activating said timer, said timer initiating a timing sequence when activated by said switch, wherein said flasher alternately illuminates said first and second color light emitting diodes (LEDs) to indicate said interim condition and said timer ending said timing sequence after a pre-determined amount of time, wherein said machine control unit provides power to the machine being guarded and illuminates said second color light emitting diode (LED) to indicate said dangerous condition of the machine being guarded.

8. A machine guarding system as defined in claim 1, further comprising a guard cage substantially surrounding the machine being guarded, said guard cage defining a machine work area and an entrance to said machine work area and said switch mat being placed at said entrance to said machine work area for detecting intrusion into said machine work area.

9. A machine guarding system as defined in claim 1, comprising a plurality of switch mats surrounding the machine being guarded and electrically connected to each other, said plurality of switch mats defining a machine work area.

10. A method for guarding a machine work area against intrusion comprising the steps of:
   providing a switch mat on a floor adjacent the machine work area being guarded, said switch mat including a pressure actuated switch mechanism and a status indicator display;
   terminating power to a machine in the machine work area when a pressure is applied to said switch mechanism of said switch mat; and
   illuminating said indicator display of said switch mat based on a status of the machine work area.

11. A method for guarding a machine work area as defined in claim 10, wherein said step of illuminating indicator display of said switch mat comprises the step of illuminating a plurality of light emitting diodes (LEDs).

12. A method for guarding a machine work area as defined in claim 11, wherein said step of illuminating said indicator display of said switch mat comprises the steps of illuminating a first color light emitting diode (LED) to indicate a safe condition of the machine work area and illuminating a second color light emitting diode (LED) to indicate a dangerous condition of the machine work area.

13. A method for guarding a machine work area as defined in claim 12, wherein said first color light emitting diode (LED) is illuminated when a pressure is applied to said switch mechanism and power is terminated to the machine in the work area to indicate said safe condition.

14. A method for guarding a machine work area as defined in claim 12, further including the step of alternately illuminating said first and second color light emitting diodes (LEDs) to indicate an interim condition of the machine work area.

15. A method for guarding a machine work area as defined in claim 14, further including the steps of:
   initiating a timing sequence to begin said step of alternately illuminating said first and second color light emitting diodes (LEDs) to indicate said interim condition;
   ending said timing sequence after a pre-determined amount of time;
   illuminating said second color light emitting diode (LED) to indicate said dangerous condition of the machine work area after said timing sequence has ended; and
   providing power to the machine in the machine work area after said timing sequence has ended.

16. A switch mat comprising:
   a support frame;
   a flexible plate member supported in said support frame;
   a pressure actuated switch mechanism disposed between said support frame and said plate member, wherein pressure applied to said plate member actuates said switch mechanism; and
   a status indicator display disposed on a surface of one of said support frame or said plate member, said status indicator display being illuminated upon actuation of said switch mechanism, wherein said status indicator display comprises a plurality of light emitting diodes (LEDs) including a first color illuminated to indicate a safe condition and a second color illuminated to indicate a dangerous condition.

17. A switch mat as defined in claim 16, wherein said first color light emitting diode (LED) is illuminated upon actuation of said switch mechanism.

18. A switch mat as defined in claim 16, wherein said support frame includes a ramp portion, said status indicator display being disposed on a top surface of said ramp portion.

19. A switch mat as defined in claim 16, further comprising a flasher for alternately illuminating said first and second color light emitting diodes (LEDs) to indicate an interim condition.

* * * * *